United States Patent
Park et al.

(10) Patent No.: US 8,375,332 B2
(45) Date of Patent: Feb. 12, 2013

(54) APPARATUS AND METHOD FOR DISPLAYING MULTIMEDIA CONTENTS TO ACCOMMODATE A USER'S PREFERENCE USING LIMITED BUTTONS OF A DEVICE

(75) Inventors: Hyun-mi Park, Suwon-si (KR); Seung-eok Choi, Seocho-gu (KR); In-sik Myung, Bupyeong-gu (KR); Hyun-joo Kang, Seocho-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 802 days.

(21) Appl. No.: 11/653,908

(22) Filed: Jan. 17, 2007

(65) Prior Publication Data

US 2007/0174791 A1   Jul. 26, 2007

(30) Foreign Application Priority Data

Jan. 20, 2006   (KR) .................. 10-2006-0006467

(51) Int. Cl.
*G06F 3/048* (2006.01)
(52) U.S. Cl. .................. 715/838; 715/841; 715/821
(58) Field of Classification Search .................. 715/838, 715/841, 821
See application file for complete search history.

(56) References Cited

U.S. PATENT DOCUMENTS

| | | | |
|---|---|---|---|
| 6,018,337 A * | 1/2000 | Peters et al. | 715/723 |
| 2002/0167538 A1 | 11/2002 | Bhetanabhotla | |
| 2003/0033296 A1 | 2/2003 | Rothmuller et al. | |
| 2004/0233239 A1 * | 11/2004 | Lahdesmaki | 345/810 |
| 2005/0166149 A1 | 7/2005 | Frigon et al. | |

FOREIGN PATENT DOCUMENTS

| | | |
|---|---|---|
| CN | 1319815 A | 10/2001 |
| EP | 1091584 A2 | 9/2000 |
| KR | 10-2004-0097522 A | 11/2004 |
| KR | 10-2005-0005142 A | 1/2005 |
| KR | 10-2005-0005908 A | 1/2005 |
| KR | 10-2005-0020744 A | 3/2005 |
| KR | 10-2005-0070350 A | 7/2005 |
| KR | 10-2005-0077123 A | 8/2005 |
| WO | 2004/010689 A1 | 1/2004 |

* cited by examiner

*Primary Examiner* — Andrey Belousov
(74) *Attorney, Agent, or Firm* — Sughrue Mion, PLLC

(57) ABSTRACT

Provided are an apparatus and method of displaying multimedia contents, more particularly, an apparatus and method of displaying stored multimedia contents to accommodate a user's preference using limited buttons of a remote control device or a cellular phone. The apparatus for displaying multimedia contents includes an alignment condition determination unit determining an alignment condition corresponding to a first user command signal among a plurality of alignment conditions, a detailed condition determination unit determining a detailed condition corresponding to a second user command signal among detailed conditions included in the alignment condition, a contents extraction unit extracting first multimedia contents according to the determined detailed condition, and a display unit displaying the determined alignment condition in a first region, the determined detailed condition in a second region, and a second multimedia contents selected by a user among the extracted first multimedia contents in a third region of a screen.

29 Claims, 13 Drawing Sheets

FIG. 5

| MULTIMEDIA CONTENTS | GENERATION TIME | MAIN COLOR | CONTENT | PREFERENCE | GENERATION PERIOD |
|---|---|---|---|---|---|
| CONTENTS 1 | 2005 . 01 . 27 | RED | THREE PEOPLE | 1 | FIFTH PERIOD |
| CONTENTS 2 | 2005 . 02 . 15 | BLUE | ONE PERSON | 1 | FIFTH PERIOD |
| CONTENTS 3 | 2003 . 07 . 17 | SKY BLUE | INVERTED TRIANGLE COMPOSITION | 2 | THIRD PERIOD |
| CONTENTS 4 | 2003 . 10 . 12 | YELLOW | ROOM 2 | 2 | THIRD PERIOD |
| CONTENTS 5 | 2006 . 05 . 07 | PURPLE | ONE PERSON | 1 | SIX PERIOD |
| CONTENTS 6 | 2006 . 01 . 21 | GREEN | MANY PEOPLE | 3 | SIX PERIOD |
| CONTENTS 7 | 2004 . 03 . 27 | WHITE | LANDSCAPE 1 | 2 | FOURTH PERIOD |
| CONTENTS 8 | 2002 . 11 . 11 | BLACK | ONE PERSON | 3 | SECOND PERIOD |
| CONTENTS 9 | 2000 . 01 . 10 | GRAY | LANDSCAPE 2 | 4 | FIRST PEIOD |
| CONTENTS 10 | 2000 . 05 . 03 | RED | ROAD 1 | 4 | FIRS PERIOD |

APPARATUS AND METHOD FOR DISPLAYING MULTIMEDIA CONTENTS TO ACCOMMODATE A USER'S PREFERENCE USING LIMITED BUTTONS OF A DEVICE

CROSS REFERENCE TO RELATED APPLICATION

This application claims priority from Korean Patent Application No. 10-2006-0006467 filed on Jan. 20, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to displaying multimedia contents, and in particular, to an apparatus and method for displaying stored multimedia contents to accommodate a user's preference using limited buttons of a remote control device or a cellular phone.

2. Description of the Related Art

Increasing Internet usage by users having various backgrounds and interests has had a huge impact on all digital industries, particularly with respect to Internet-based services and contents which may be customized based on a user's background and interests. Internet-based services and contents, which are provided through the Internet, are becoming the standards of digital industries in the 21st century. In addition, due to the fast growth of Internet networks and multimedia contents in cellular phones, PDAs, and notebook computers, utilization of multimedia is essential rather than optional.

The development from analog TV to digital TV is in progress, and users may receive various types of information, as well as public broadcast, through the TV.

FIG. 1 shows the development of digital information appliances. The 1980's is a computing network era, where information communication is performed through a network having personal computers (PCs), notebook computers, a main frame computer, and a workstation. This is limitedly used in institutes or offices.

From the early 1990's, development of the Internet moved forward, and the interest in a home station grew by steps. The Internet, which had been used by institutes and offices, began to be used personally and at home.

In the 2000's, the development of wireless networks has been very great, and transfer rates of wireless networks have markedly increased. As a result, as described above, transfer and storage of mass multimedia content has become very popular, and studies for digital broadcast are actively in progress. Further, some multimedia services have been put into commercial use. Meanwhile, many appliances have changed to information appliances under a ubiquitous concept. Digital information can now be communicated through digital televisions, cellular phones, video phones, smart phones, as well as computers and workstations. In addition, digital information communication has become possible between appliances, such as a refrigerator, an electronic oven, an air conditioner, and so on, under the concepts of the ubiquitous home network.

Here, the user uses a remote control device, a home-pad, or a wall-pad to search various kinds of digital information, but the information search is not easily performed due to the characteristics of these devices.

That is, when a storage unit of digital information to be searched is a file, the user can use arrow buttons provided in the remote control device or the like in order to search a small number of files (for example, 10 to 20). However, as the number of files increases (for example, 100 to 1000), it is difficult to search desired information only with the arrow buttons.

That is, the information search with the arrow buttons is not sufficient when there is a large amount of digital information. Accordingly, there is a need for a unit that assigns a specified address, where the digital information is stored, so as to allow the information to be easily searched.

FIG. 2 is a conceptual view showing that searched information is displayed using a known display device. A display device 22 displays information selected by the user. At this time, the user uses arrow buttons provided in a remote control device 23 or the like in order to search stored information 21. In general, the information 21 is stored in a one-dimensional structure according to predetermined conditions. That is, the information 21 is stored in a sequence according to the conditions, such as file names, file sizes, file types, the generation date, or the correction date. Specifically, the information 21 is stored in a one dimensional condition according the specified conditions. Accordingly, in searching the stored information 21, the user can search information immediately before or after currently searched information with one click of the arrow button. In order to search information distant from the currently searched information using such a successive search method, a large number of clicks of the arrow button is required.

Korean Unexamined Patent Application No. 2005-070350 discloses a method and an apparatus for searching images of an electronic album that decodes an image for an electronic album input to a digital TV so as to display the image in a form of a thumbnail in an upper portion, and displays main data of the thumbnail image in a lowermost portion. In this case, a scroll bar that selects the images is provided.

However, this technique simply displays main data and the thumbnail for the main data, and does not specify an alignment condition thereof. Accordingly, the user may find it difficult to search enormous multimedia contents. Therefore, there is a need for a method that can display multimedia contents according to an alignment condition corresponding to a user's taste and can search stored multimedia contents using a limited input unit.

SUMMARY OF THE INVENTION

An aspect of the invention is to display stored multimedia contents to suit a user's taste using limited buttons of a remote control device or a cellular phone.

Aspects of the present invention are not limited to those mentioned above, and other aspects of the present invention will be understood by those skilled in the art through the following description.

According to an aspect of the invention, an apparatus for displaying multimedia contents includes an alignment condition determination unit determining an alignment condition corresponding to a first user command signal among a plurality of alignment conditions, a detailed condition determination unit determining a detailed condition corresponding to a second user command signal among detailed conditions included in the alignment condition, a contents extraction unit extracting first multimedia contents according to the determined detailed condition, and a display unit displaying the determined alignment condition in a first region, the determined detailed condition in a second region, and a second multimedia contents to be selected by a user among the extracted first multimedia contents in a third region of a screen.

According to another aspect of the invention, a method of displaying multimedia contents includes determining an alignment condition corresponding to a first user command signal among a plurality of alignment conditions, determining a detailed condition corresponding to a second user command signal among detailed conditions included in the alignment condition, extracting first multimedia contents according to the determined detailed condition, and displaying the determined alignment condition in a first region, the determined detailed condition in a second region, and a second multimedia contents selected by a user among the extracted first multimedia contents in a third region.

BRIEF DESCRIPTION OF THE DRAWINGS

The above and other aspects, features and advantages of the present invention will become more apparent by describing in detail exemplary embodiments thereof with reference to the attached drawings, in which:

FIG. 5 is a diagram illustrating an alignment condition table according to an exemplary embodiment of the invention;

DETAILED DESCRIPTION OF THE EXEMPLARY EMBODIMENTS

Figure 1:
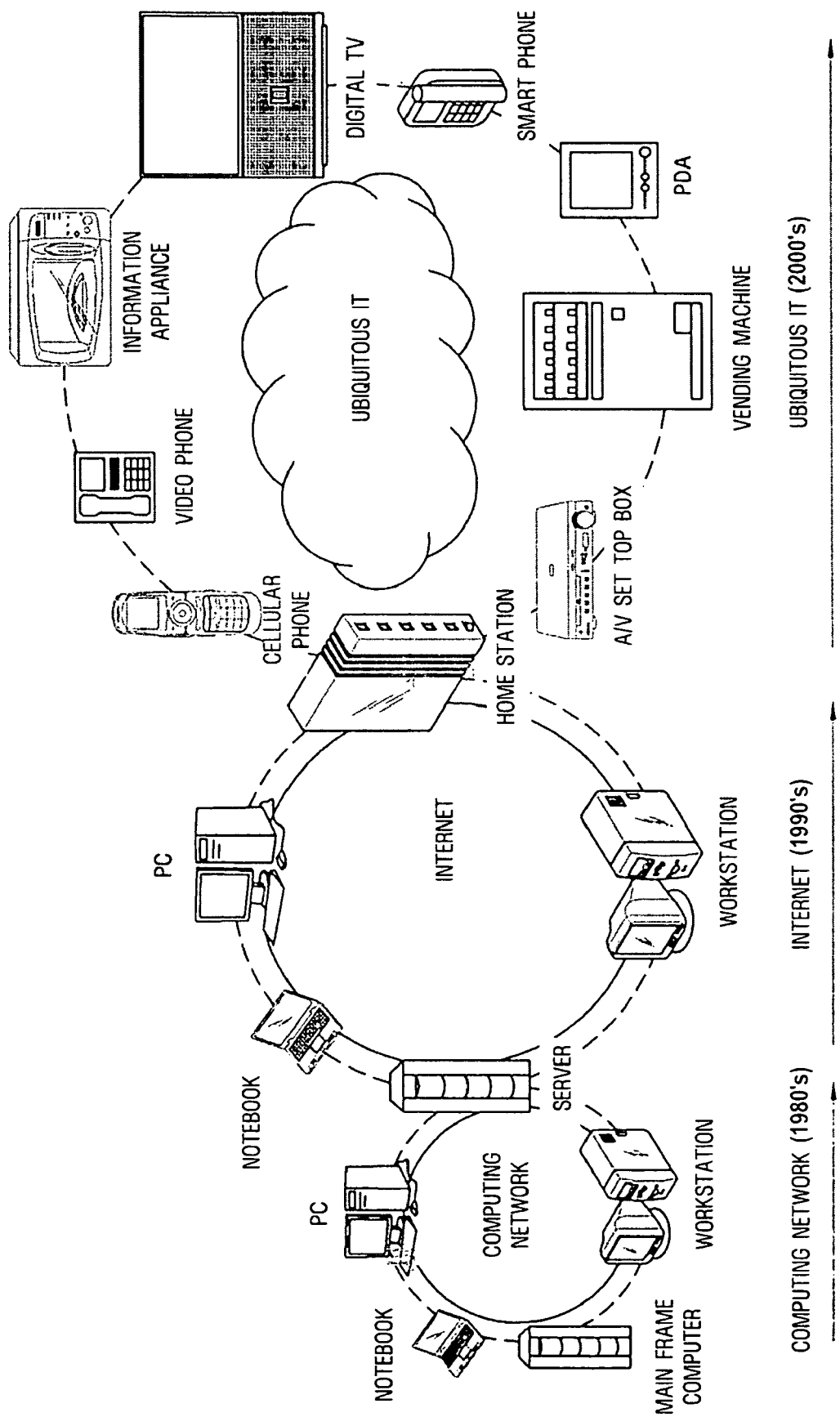
FIG. 1 shows the development of digital information appliances.
Figure 2:
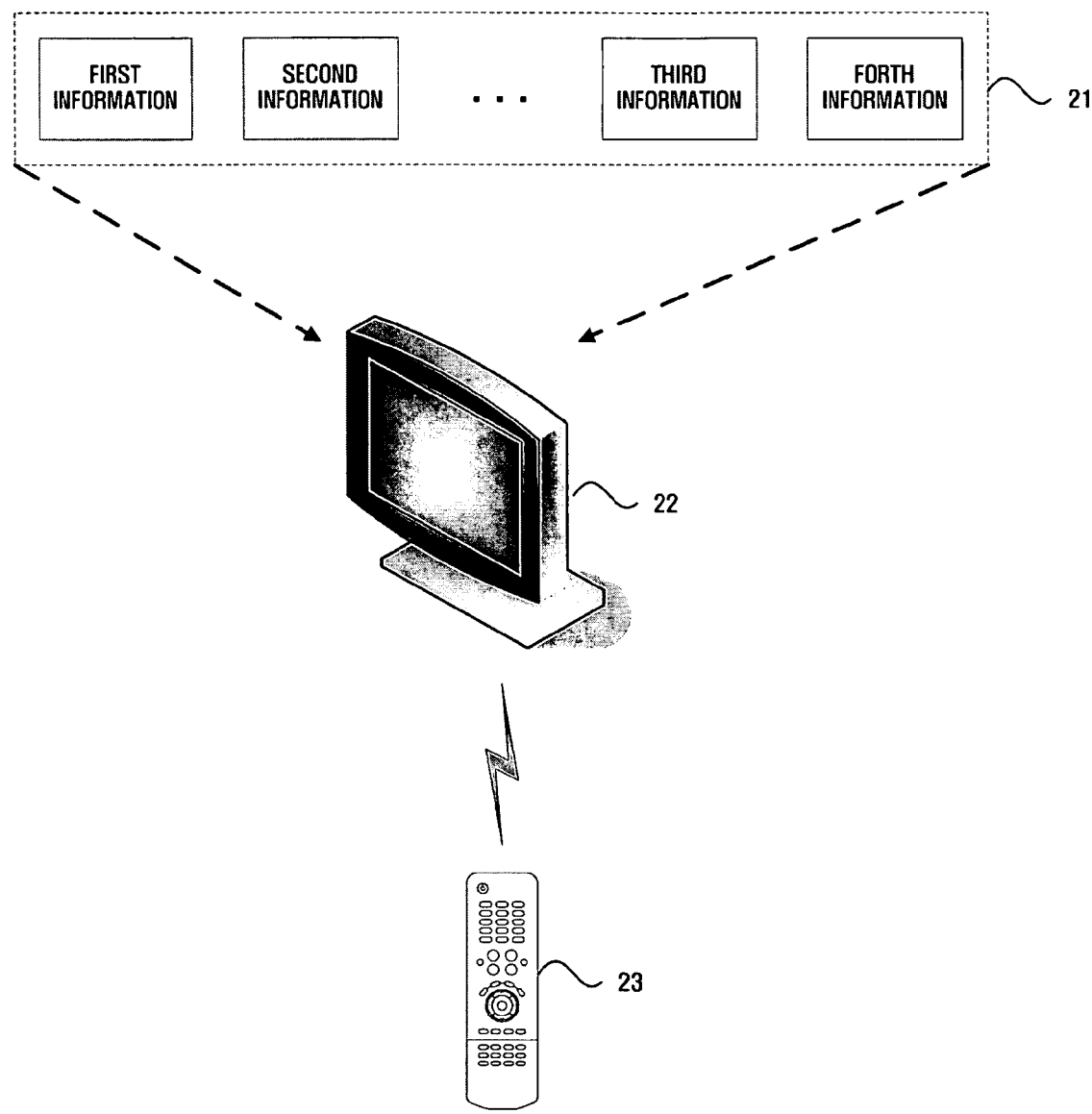
FIG. 2 is a conceptual view illustrating a case where searched information is displayed using a known display device.

The aspects and features of the present invention and methods of accomplishing the same will become more apparent by referring to the exemplary embodiments and the accompanying drawings. However, the present invention may be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described in detail with reference to the accompanying drawings.

Figure 3:
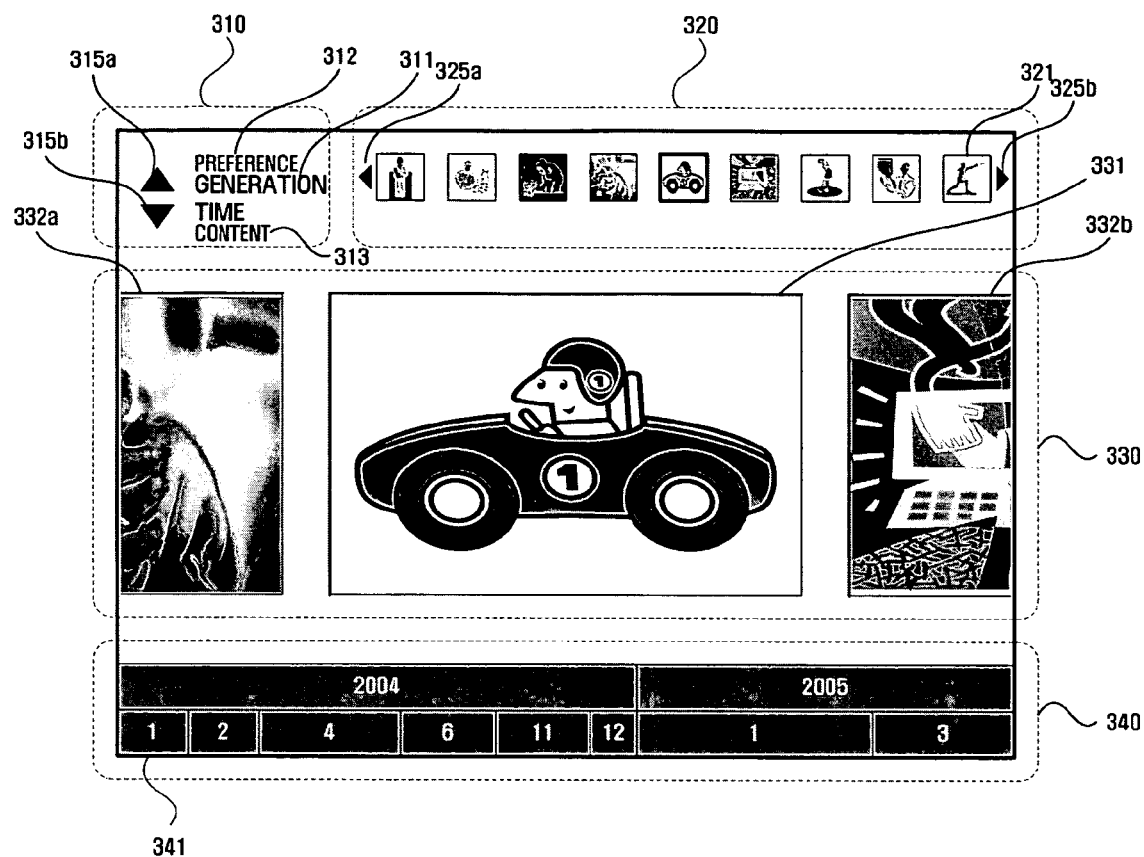
FIG. 3 is a conceptual view illustrating a case where multimedia contents are displayed according to an exemplary embodiment of the invention.

FIG. 3 is a conceptual view showing a case where multimedia contents are displayed according to an embodiment of the invention. A displayed screen includes an alignment condition region 310, a thumbnail region 320, a multimedia contents region 330, and a detailed condition region 340.

The alignment condition region 310 is a region, in which a current alignment condition 311 and alignment conditions 312 and 313 close to the current alignment condition 311 are displayed. The adjacent alignment conditions 312 and 313 include a previous alignment condition 312 and a next alignment condition 313.

A user can change the alignment condition using given buttons or the like. For example, when an up button of up and down buttons is selected, the previous alignment condition 312 can be changed to the current alignment condition. Further, when a down button is selected, the next alignment condition 313 can be changed to the current alignment condition.

Here, the individual alignment conditions can be displayed in forms of texts or images. In order to improve a visual recognition rate of the user, the text or image 311 corresponding to the current alignment condition may be displayed larger or more clearly than the texts or image 312 and 313 of the adjacent alignment conditions.

Further, images 315a and 315b providing directions may be displayed on the screen in the alignment condition portion that can be selected by the user in order to change the alignment condition, and their activation states may be determined by the presence/absence of adjacent alignment conditions. For example, when the up button and the down button correspond to the previous alignment condition and the next alignment condition respectively, and if both the previous alignment condition and the next alignment condition exist, images 315a and 315b for up and down directions are activated. When the next alignment condition does not exist, the image 315b for the down direction is inactivated.

The thumbnail region 320 is a region in which thumbnails 321 for the multimedia contents are displayed. The thumbnails 321 are displayed in a sequence according to the alignment condition 311 and a detailed condition 341 selected by the user. The thumbnails 321 for a part or all of the stored multimedia contents can be displayed.

The user can change a focus for the displayed thumbnails 321 using the given buttons or the like. For example, when a left button of the left and right buttons is selected, a left thumbnail is focused. Further, when the right button is selected, a right thumbnail is focused. Here, the selected thumbnail can be displayed larger or more clearly than other thumbnails. Alternatively, a border of the selected thumbnail may be formed thicker.

Meanwhile, the multimedia contents 331 according to an embodiment of the invention can include still pictures or motion pictures. Preferably, the thumbnails 321 that are displayed in the thumbnail region 320 are still pictures. According to the user's selection, motion pictures may be displayed.

When the thumbnails are arranged in a row, images 325a and 325b for individual directions can be displayed in the vicinities of the thumbnails at both ends. The activation states of images 325a and 325b for the directions can be determined according to whether any thumbnails exist in the directions from the thumbnail at the ends. For example, as shown in FIG. 3, when the thumbnails are horizontally arranged in a row, and a thumbnail exists in a right direction from the thumbnail at the right end, the image 325b for the right direction is activated. When a thumbnail does not exist in the right direction, the image 325b for the right direction is inactivated.

The multimedia contents region 330 is a region in which the multimedia contents 331 are displayed. For example, still pictures, such as bitmap, JPEG (Joint Photographic Experts Group), GIF (Graphics Interchange Format), and TIFF (Tag Image File Format), and motion pictures, such as MPEG (Moving Picture Experts Group), AVI (Audio Video Interleaved file), WMV (Windows Media Video), and DIVX (Digital Video Express) can be displayed.

The multimedia contents 331 to be displayed correspond to the thumbnail selected by the user among the thumbnails 321 in the thumbnail region 320. Then, if the user changes the focus among the thumbnails using direction buttons, the multimedia contents 331 corresponding to the thumbnail of the changed focus is displayed.

That is, the user can search the stored multimedia contents using the direction buttons. As described above, by determining the alignment condition using the up and down buttons and determining the multimedia contents 331 to be displayed using the left and right buttons, the user can effectively search desired multimedia contents using the limited input unit.

In the vicinity of the multimedia contents 331 to be displayed, portions 332a and 332b adjacent to the multimedia contents 331 to be displayed can be displayed in sequence according to the alignment condition. With this arrangement, the user can visualize adjacent multimedia contents 332a and 332b as a whole, and can guess the characteristics of the multimedia contents in the search direction through the multimedia contents 331 displayed in whole and adjacent multimedia contents 332a and 332b displayed in part.

The detailed condition region 340 is a region in which at least one of text, color, and image corresponding to detailed conditions of the alignment condition 311 selected by the alignment condition region 310 is displayed. That is, the detailed condition region 340 can be divided into a plurality of detailed conditions 341. When the alignment condition is a date, the individual detailed conditions can include date information. When the alignment condition is a color, the individual detailed condition can include predetermined colors.

The user can change a focus for the detailed conditions 341 using given buttons or the like. The buttons for changing the focus for the detailed conditions 341 include numeral buttons and direction buttons. For example, when the user selects a specified numeral button, the detailed condition corresponding to the numeral is focused. Further, when a left button of left and right buttons is selected, a left detailed condition is focused, and, when the right button is selected, a right detailed condition is focused. Here, the selected detailed condition can be displayed larger or more clearly than other detailed conditions. Alternatively, a border of the selected detailed condition may be formed thicker.

As illustrated above, the up and down buttons 315a and 315b, respectively, are used to search the alignment condition, and the left and right buttons 325a and 325b, respectively, are used to search the thumbnail. Accordingly, left and right buttons that are used to search the detailed condition may be separately provided. Further, a separate button that switches the left and right buttons to search the thumbnail or the detailed condition may be provided.

That is, the user can search the thumbnail using a first set of left and right buttons of two sets of left and right buttons, and can search the detailed condition using a second set of left and right buttons. In addition, the user can search the thumbnail or the detailed condition using one set of left and right buttons while changing from the thumbnail region and the detailed condition region using a predetermined function switch button.

As the detailed condition 341 of the detailed condition region 340 changes, the thumbnails 321 that are displayed in the thumbnail region 320 are changed corresponding to the detailed condition 341, and then the multimedia contents 331 to be displayed in the multimedia contents region 330 changes corresponding to a newly focused thumbnail in the thumbnail region 320.

That is, the user can search in a larger unit according to the alignment condition using the search of the detailed condition 341 in the detailed condition region 340, and can search in a smaller unit according to the alignment condition using the search of the thumbnail in the thumbnail region 320. Accordingly, the user can fast and simply extract desired multimedia contents using the limited input unit.

Figure 4:
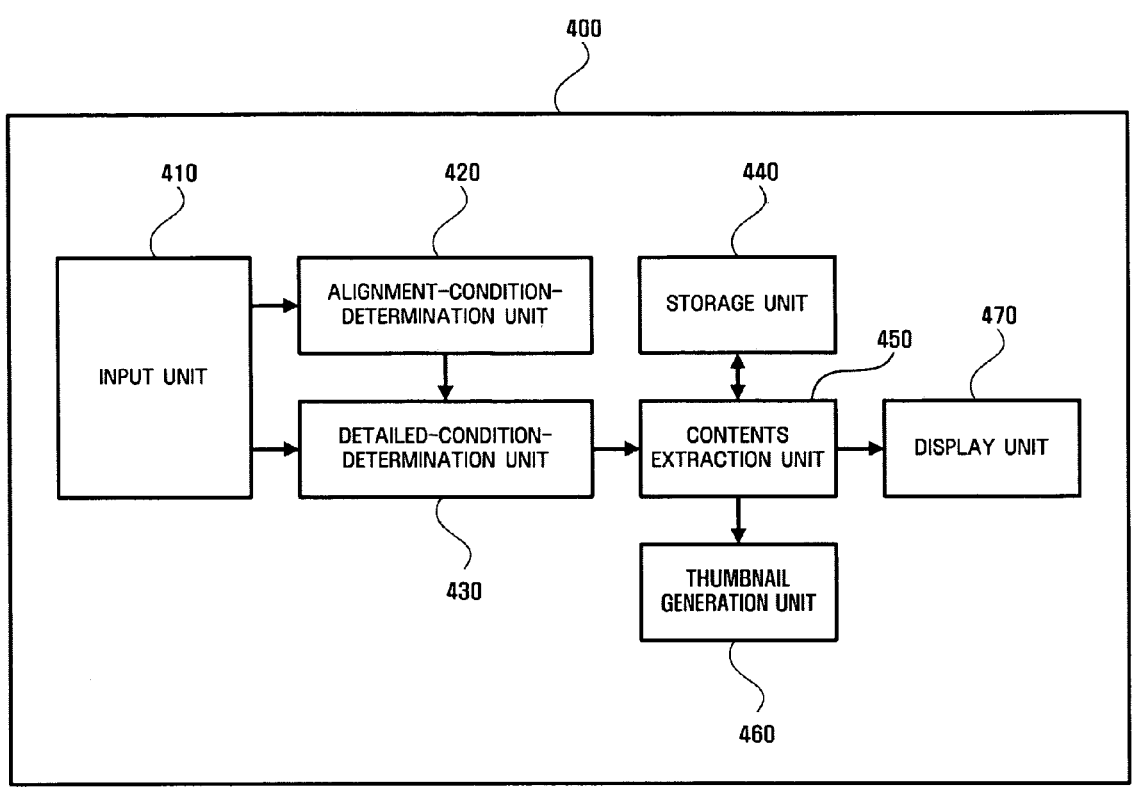
FIG. 4 is a block diagram illustrating an apparatus for displaying multimedia contents according to an exemplary embodiment of the invention.

FIG. 4 is a block diagram showing an apparatus for displaying multimedia contents according to an embodiment of the invention. The apparatus for displaying multimedia contents (hereinafter, referred to as a contents display device) 400 includes a storage unit 440, an input unit 410, an alignment condition determination unit 420, a detailed condition determination unit 430, a contents extraction unit 450, a thumbnail generation unit 460, and a display unit 470.

The storage unit 440 stores the multimedia contents. Further, the storage unit 440 can store information related to the alignment conditions of the stored multimedia contents.

The information on the alignment conditions is used to determine an arrangement sequence of the stored multimedia contents according to a specified alignment condition. For example, when the alignment condition is a date, the information on the alignment condition becomes a generation time of each of the multimedia contents, such that the multimedia contents can be arranged in a sequence of the generation time.

The information of the alignment conditions can be stored in a form of a table, and the details of the table will be described below with reference to FIG. 5.

The storage unit 440 is a module, in which input/output of information is possible, such as a hard disk, a flash memory, a CF card (Compact Flash Card), an SD card (Secure Digital Card), an SM card (Smart Media Card), an MMC card (Multimedia Card), or a memory stick. The storage unit may be provided in the contents display device 400 or may be provided in a separate apparatus.

The input unit 410 receives user command signals. Here, the user command signals include at least one of direction button signals and numeral button signals. The direction button signals can be used for the search of the alignment condition, the search of the thumbnail, the search or fast search of the detailed condition, and the numeral button signals can be used for the search or fast search of the detailed condition. The search of the alignment condition, the search of the thumbnail, and the search of detailed condition have been described above with reference to FIG. 3 and thus will be omitted.

Meanwhile, the fast search is a search method that uses the generation time of the multimedia contents. The user can input time information of a predetermined year, month, and date using the numeral buttons, and the contents display device 400 extracts and displays multimedia contents corresponding to the input time information. For example, if time information of Jan. 6, 2005 is input, the contents display device 400 extracts and displays the multimedia contents generated at the input time or extracts and displays multimedia contents closest to the input time. Further, the user can perform the fast search using the direction buttons. For example, if one of the direction buttons is selected beyond a predetermined critical time, the contents display device 400 displays the multimedia contents that is focused when the focus is changed at high speed in that direction. The details will be described below with reference to FIGS. 11 and 12.

The input unit 410 has direction buttons and numeral buttons, and buttons of a remote control device or buttons of a portable terminal can be used as the input unit 410.

The alignment condition determination unit 420 determines an alignment condition corresponding to a first user command signal among a plurality of alignment condition. Here, the first user command signal includes direction button signals. The alignment condition determination unit 420 can determine the alignment condition according to an up/down button signal among the direction button signals.

The plurality of alignment conditions include at least one of a sequence of generation time of the multimedia contents, a sequence of main colors included in the multimedia contents, a sequence of contents included in the multimedia contents, a sequence of user's preference for multimedia contents, and a sequence of generation periods, in which the multimedia contents are generated.

The generation time of the multimedia contents may be information including a year, month, date, hour, minute, and second, at which the multimedia contents is generated.

The main color is a color representative of the multimedia contents. The main color may be a predominant color among colors included in the multimedia contents or may be an average color of colors included in the multimedia contents. For example, when red pixels predominantly exist in the multimedia contents, the main color may be red, and, when red and blue are included in multimedia contents with a similar amount, the main color may be purple.

To this end, a main color extraction unit (not shown) that extracts the main colors for the stored multimedia contents may be provided in the contents display device 400.

The contents included in the multimedia contents are to distinguish whether the multimedia contents are contents for a landscape or contents for a person. The contents for a person are subdivided according to the number of persons. Further, the contents included in the multimedia contents include compositions of the multimedia contents. For example, the multimedia contents including a wide sight and sky and the multimedia contents having a wide sea and sky are regarded as multimedia contents having similar structures, such that they can be arranged to be close to each other.

In order to judge the composition, a pattern recognition unit (not shown) may be provided in the contents display device 400. The pattern recognition unit (not shown) sets regions of the multimedia contents by similar patterns. Therefore, the multimedia contents having similar compositions are regarded as those having similar compositions, such that they are arranged close to each other according to the alignment condition.

The preference for the multimedia contents can be determined by the number of search times by the user. The preference may be separately determined by the user.

The generation period of the multimedia contents is a period, such as date, week, month, and year, which can be arbitrarily determined by the user. The user can group the generation time of the multimedia contents for every predetermined period. For example, when a plurality of multimedia contents are stored in a sequence of the generation time, the user can group the generation time for every ten days or for every month.

A difference between an alignment condition (hereinafter, referred to as a first alignment condition) according to a sequence of the generation time of the multimedia contents and an alignment condition (hereinafter, referred to as a second alignment condition) according to a sequence of the generation periods of the multimedia contents may be a search unit of the detailed condition to be displayed in the detailed condition region. In case of the first alignment condition, the search unit of the detailed condition is limited to the week, month, or year. However, in case of the second alignment condition, the search unit of the detailed condition may be arbitrarily determined by the user, for example, for every eleven days, for every hundred days, or for every one month and fifteen days.

The detailed condition determination unit 430 determines a detailed condition corresponding to a second user command signal among detailed conditions included in the alignment condition determined by the alignment condition determination unit 420. Here, the second user command signal includes at lease one of direction button signals and numeral button signals. The detailed condition determination unit 430 can determine the detailed condition according to a left/right button signal among direction button signals or one of numeral button signals.

The contents extraction unit 450 extracts multimedia contents according to the detailed condition determined by the detailed condition determination unit 430. For example, when the determined detailed condition is the detailed condition included in the alignment condition according to the sequence of generation time of the multimedia contents, the contents extraction unit 450 first extracts multimedia contents generated earliest among the multimedia contents with respect to the generation time of the detailed condition stored in the storage unit 440, and extracts multimedia contents generated latest with respect to the generation time of the detailed condition last.

The contents extraction unit 450 can extract the multimedia contents selected by the user according to the left/right button signal among the direction button signals or one of the numeral button signals. That is, in a state where the multimedia contents and the thumbnails are displayed, the user can change the detailed condition using the left and right buttons. As the detailed condition changes, the contents extraction unit 450 extracts the multimedia contents corresponding to the changed detailed condition. Further, the user can input the date, and the contents extraction unit 450 can extract the multimedia contents corresponding to or close to the date.

In addition, the contents extraction unit 450 can extract the multimedia contents around the multimedia contents previously selected by the user. For example, when specified multimedia contents is selected by the user and is displayed, even though the alignment condition and the detailed condition are changed, the displayed multimedia contents continues to be displayed, and adjacent multimedia contents around the displayed multimedia contents can be extracted.

The thumbnail generation unit 460 generates the thumbnails of the multimedia contents extracted by the contents extraction unit 450. The contents extraction unit 450 extracts the multimedia contents according to the detailed condition determined by the detailed condition determination unit 430. All thumbnails of the extracted multimedia contents may not be displayed simultaneously. Therefore, the thumbnail generation unit 460 can generate a predetermined number of thumbnails to be displayed. For example, if the number of the stored multimedia contents is 100, and if the number of the thumbnails to be displayed is 9, the contents extraction unit 450 extract 100 multimedia contents according to the alignment condition, but the thumbnail generation unit 460 generates only the thumbnails for 9 multimedia contents among the extracted multimedia contents according to the detailed condition. Here, the extracted multimedia contents according to the detailed condition refer to at least one multimedia contents corresponding to a specified detailed condition, and the number of the extracted multimedia contents can vary according to the alignment condition and the detailed condition.

Further, the multimedia contents according to an embodiment of the invention may be still pictures and motion pictures. When the multimedia contents extracted by the contents-extraction unit 450 is a motion picture, the thumbnail generation unit 460 can generate a thumbnail for the first frame of the motion picture.

Meanwhile, a frame selected by the user among the frames included in the motion picture may be generated as a thumbnail by the thumbnail generation unit 460, and the thumbnail generated in such a manner is stored in the storage unit 440. When the motion picture is extracted, the thumbnail can be extracted simultaneously and displayed.

The display unit 470 displays the alignment condition, the detailed condition, and the multimedia contents selected by the user among the multimedia contents extracted by the contents extraction unit 450 in the alignment condition region 310, the detailed condition region 340, and the multimedia contents region 330, respectively. Further, the display unit 470 displays thumbnails for a part or all of the multimedia contents extracted by the contents extraction unit 450, that is, the thumbnails generated by the thumbnail generation unit 460 in the thumbnail region 320.

The display unit 470 includes a module having an image display unit that can display an input image signal, such as a CRT (Cathode Ray Tube), an LCD (Liquid Crystal Display), an LED (Light-Emitting Diode), an OLED (Organic Light-Emitting Diode), or a plasma display panel (PDP).

FIG. 5 is a diagram showing an alignment condition table according to an exemplary embodiment of the invention. The alignment condition table 500 has a multimedia contents field 510, a generation time field 520, a main color field 530, a content field 540, a preference field 550, and a generation period field 560.

The multimedia contents field 510 includes the name of the multimedia contents or a unique number given to the multimedia contents.

The generation time field 520 includes the generation time of the multimedia contents. Here, the generation time can reflect the hour, minute, and second, as well as the year, month, and date.

The main color field 530 includes the main color included in the multimedia contents. As described above, the main color may be a dominant color among colors included in the multimedia contents or may be an average color of colors included in the multimedia contents. The main colors can be classified into predetermined stages, and the colors included in the multimedia contents or the average color is regarded as the most similar stage among the classified stages.

The content field 540 includes the contents of the multimedia contents, such as a landscape, a person, and a composition. The landscape can be subdivided into a wood, a coast, a city, and so on, the person can be subdivided according to the number of persons, and the composition can be subdivided according to the colors included in the multimedia contents or the pattern arrangement.

The preference field 550 has a sequence of user's preference for the multimedia contents. As described above, the preference may be determined by the number of search times by the user or may be directly determined by the user.

The generation period field 560 includes a period including the generation time of the multimedia contents. The generation period can be determined by the user. For example, when the alignment condition according to the user command signal input through the input unit 410 is the sequence of the generation periods of the multimedia contents, the contents display device 400 receives the generation period from the user, and updates the generation period filed according to the input generation period.

In case of extracting the multimedia contents according to the detailed condition transmitted from the detailed condition determination unit 430, the contents extraction unit 450 can refer to the alignment condition table 500.

Figure 6:
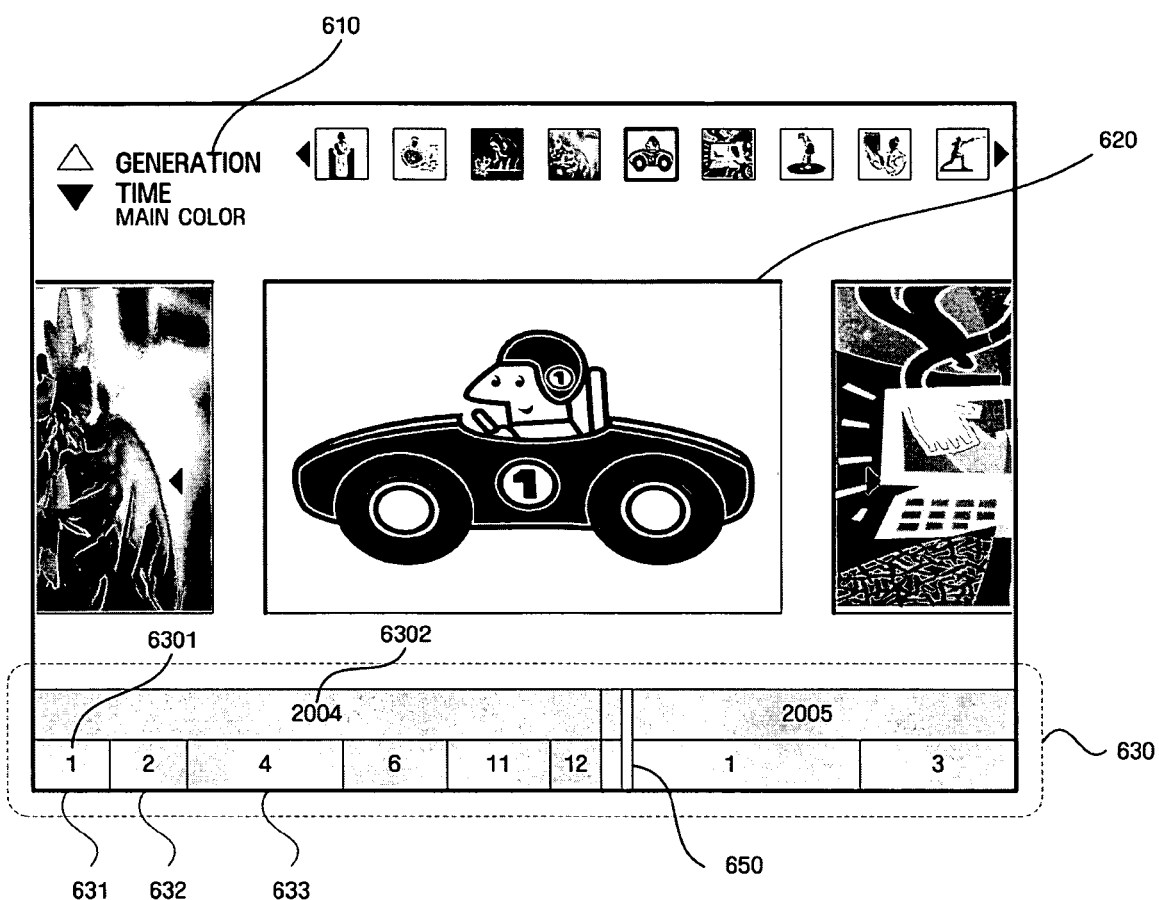
FIG. 6 is a conceptual view illustrating a case where multimedia contents are displayed in a sequence of generation time according to an exemplary embodiment of the invention.

FIG. 6 is a conceptual view showing a case where the multimedia contents are displayed in the sequence of the generation time according to an exemplary embodiment of the invention. Referring to FIG. 6, the alignment condition of the alignment condition region is selected to be the sequence of the generation time 610 of the multimedia contents, and the detailed condition region 630 is subdivided into the detailed condition for every month.

In the detailed conditions, month and year can be displayed in texts 6301 and 6302, and the sizes of the detailed conditions can proportionally vary according to the number of the multimedia contents generated that month. Further, in the detailed condition region 630, a pointer 650 can be located at a portion corresponding to the generation time of the currently displayed multimedia contents. Therefore, the user can know the position of the displayed multimedia contents 620 among all the multimedia contents, which are arranged according to the sequence of the generation time, using the position of the pointer 650.

The user can search the detailed condition for every month using the left and right buttons. For example, when the currently selected detailed condition is February 2004 632, the user can select the detailed condition 631 of January 2004 using the left button, and can select the detailed condition 633 of April 2004 using the right button.

Here, the multimedia contents that is first displayed after the detailed condition is changed may be multimedia contents corresponding closest to the changed detailed condition among the multimedia contents extracted corresponding to the changed detailed condition.

Figure 7:
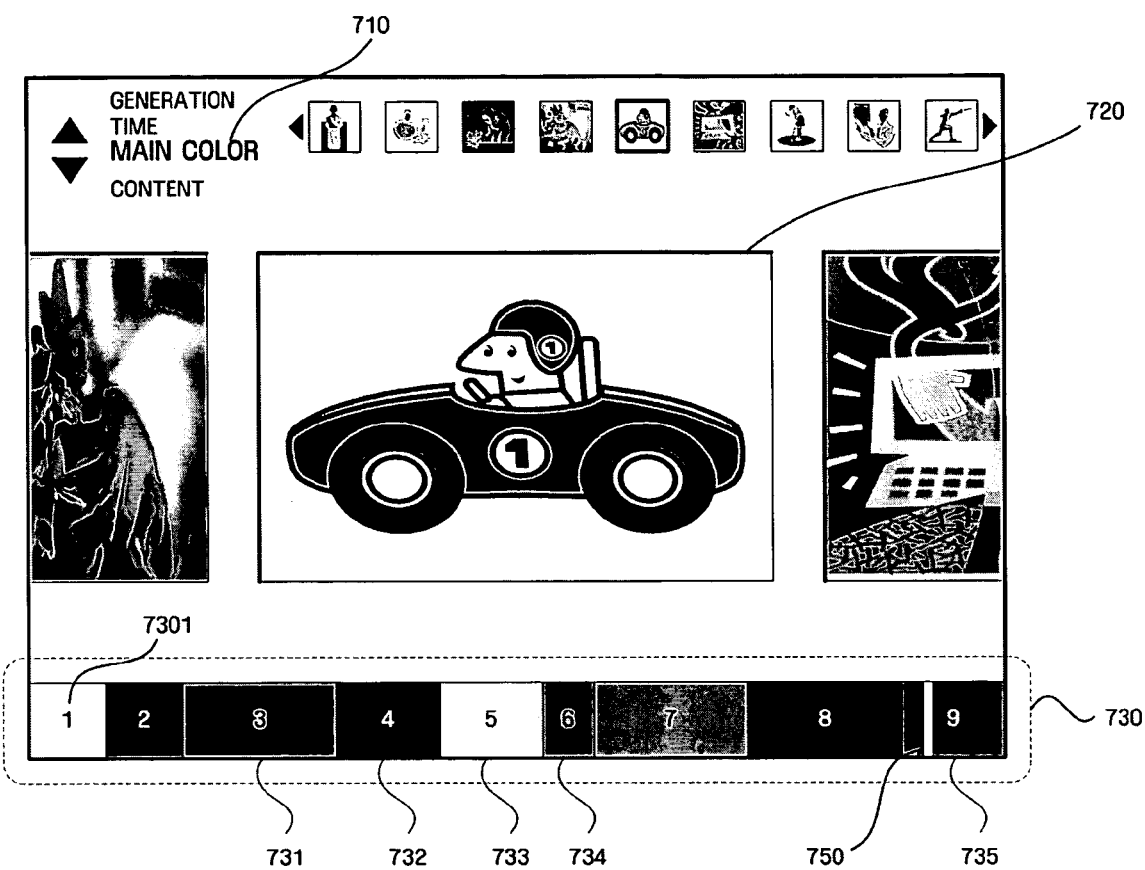
FIG. 7 is a conceptual view illustrating a case where multimedia contents are displayed in a sequence of main colors according to an exemplary embodiment of the invention.

FIG. 7 is a conceptual view showing a case where the multimedia contents are displayed in a sequence of the main colors according to an exemplary embodiment of the invention. Referring to FIG. 7, the alignment condition of the alignment condition region is selected as the sequence of the main colors 710 of the multimedia contents, and the detailed condition region 730 is subdivided into the detailed conditions of the main colors.

In the detailed conditions, the main colors and numerals 7301 are displayed. The sizes of the detailed conditions can proportionally vary according to the number of the multimedia contents having a corresponding main color. Further, in the detailed condition region 730, a pointer 750 can be located at a portion corresponding to the main color of the displayed multimedia contents 720. Therefore, the user can know the position of the displayed multimedia contents 720 among all the multimedia contents, which are arranged in the sequence of the main colors, using the position of the pointer 750.

The user can search the detailed condition of the main color using the left and right buttons. For example, when the currently selected detailed condition is a region 4 732, the user can select a region 3 731 using the left button, and can select a region 733 using the right button. Further, the user can search the detailed condition of the main color using the numeral buttons. For example, the user can use a numeral button of 6 in order to select a region 6 734, and can use a numeral button 9 in order to select a region 9 735.

Here, the multimedia contents that is first displayed after the detailed condition is changed may be multimedia contents that is located at the top of the multimedia contents among the multimedia contents extracted corresponding to the changed detailed condition.

Figure 8:
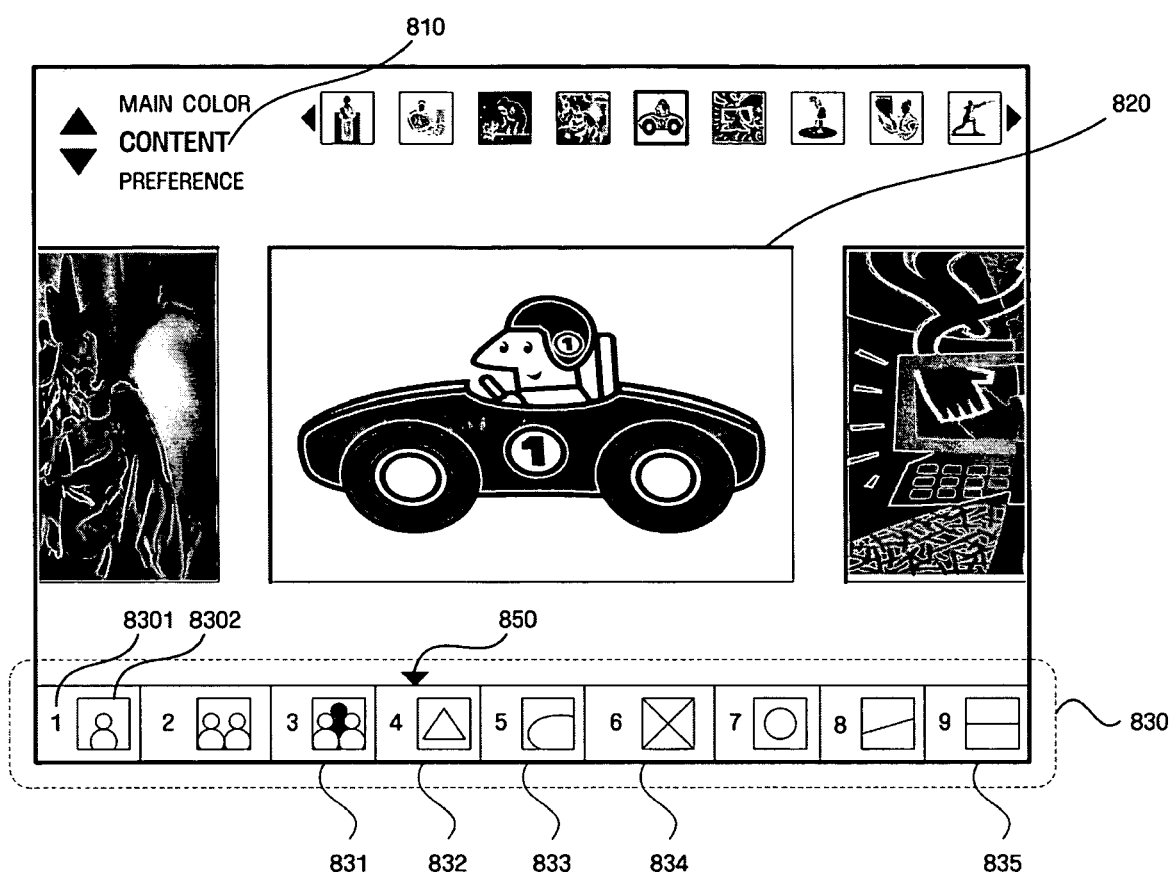
FIG. 8 is a conceptual view illustrating a case where multimedia contents are displayed in a sequence of contents according to an exemplary embodiment of the invention.

FIG. 8 is a conceptual view showing a case where the multimedia contents are displayed in the sequence of the contents according to an exemplary embodiment of the invention. Referring to FIG. 8, the alignment condition of the alignment condition region is selected to be the sequence of the contents 810 of the multimedia contents, and the detailed condition region 830 is subdivided into the detailed conditions of the contents.

In the detailed conditions, images 8302 and numerals 8301 of the contents are displayed. The sizes of the detailed conditions can proportionally vary according to the number of the multimedia contents having the corresponding contents. Further, in the detailed condition region 830, a pointer 850 may be located at a portion corresponding to the content of the currently displayed multimedia contents 820. Therefore, the user can know the position of the displayed multimedia contents 820 among all the multimedia contents, which are arranged according to the sequence of the contents, using the position of the pointer 850.

The user can search the detailed condition of the content using the left and right buttons. For example, when the currently selected detailed condition is a region 4 832, the user can select a region 3 831 using the left button, and can select a region 5 833 using the right button. Further, the user can search the detailed condition of the content using the numeral buttons. For example, the user can use a numeral button 6 in order to select a region 6 834, and can use a numeral button 9 in order to select a region 9 835.

Here, the multimedia contents that is first displayed after the detailed condition is changed may be multimedia contents that is located at the top of the multimedia contents among the multimedia contents extracted corresponding to the changed detailed condition.

Figure 9:
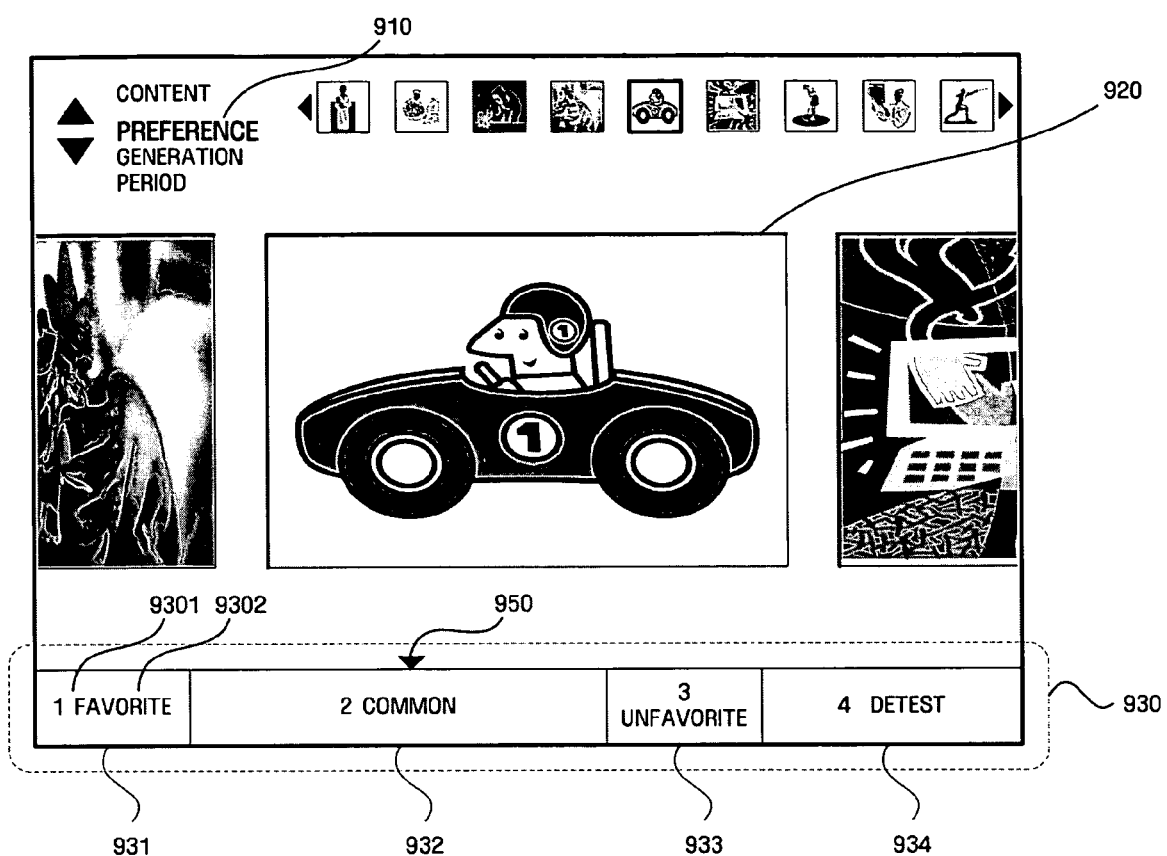
FIG. 9 is a conceptual view illustrating a case where multimedia contents are displayed in a sequence of preference according to an exemplary embodiment of the invention.

FIG. 9 is a conceptual view showing a case where the multimedia contents are displayed in the sequence of user's preference according to an exemplary embodiment of the invention. Referring to FIG. 9, the alignment condition of the alignment condition region is selected to be the sequence of the preference 910 of the multimedia contents, and the detailed condition region 930 is subdivided into the detailed conditions of the preference.

In the detailed conditions, texts 9302 and numerals 9301 of the preference are displayed. The sizes of the detailed conditions can proportionally vary according to the number of the multimedia contents having the corresponding preference. Further, in the detailed condition region 930, a pointer 950 can be located at a portion corresponding to the preference of the currently displayed multimedia contents 920. Therefore, the user can know the position of the displayed multimedia contents 920 among all the multimedia contents, which are arranged according to the sequence of the preference, using the position of the pointer 950.

The user can search the detailed condition of the preference using the left and right buttons. For example, when the currently selected detailed condition is a region 2 932, the user can select a region 1 931 using the left button, and can select a region 3 933 using the right button. Further, the user can search the detailed condition of the preference using the numeral buttons. For example, the user can use a numeral button 3 in order to select a region 3 933, and can use a numeral button 4 in order to select a region 4 934.

Here, the multimedia contents that is first displayed after the detailed condition is changed may be multimedia contents that is located at the top of the multimedia contents among the multimedia contents extracted corresponding to the changed detailed condition.

Figure 10:
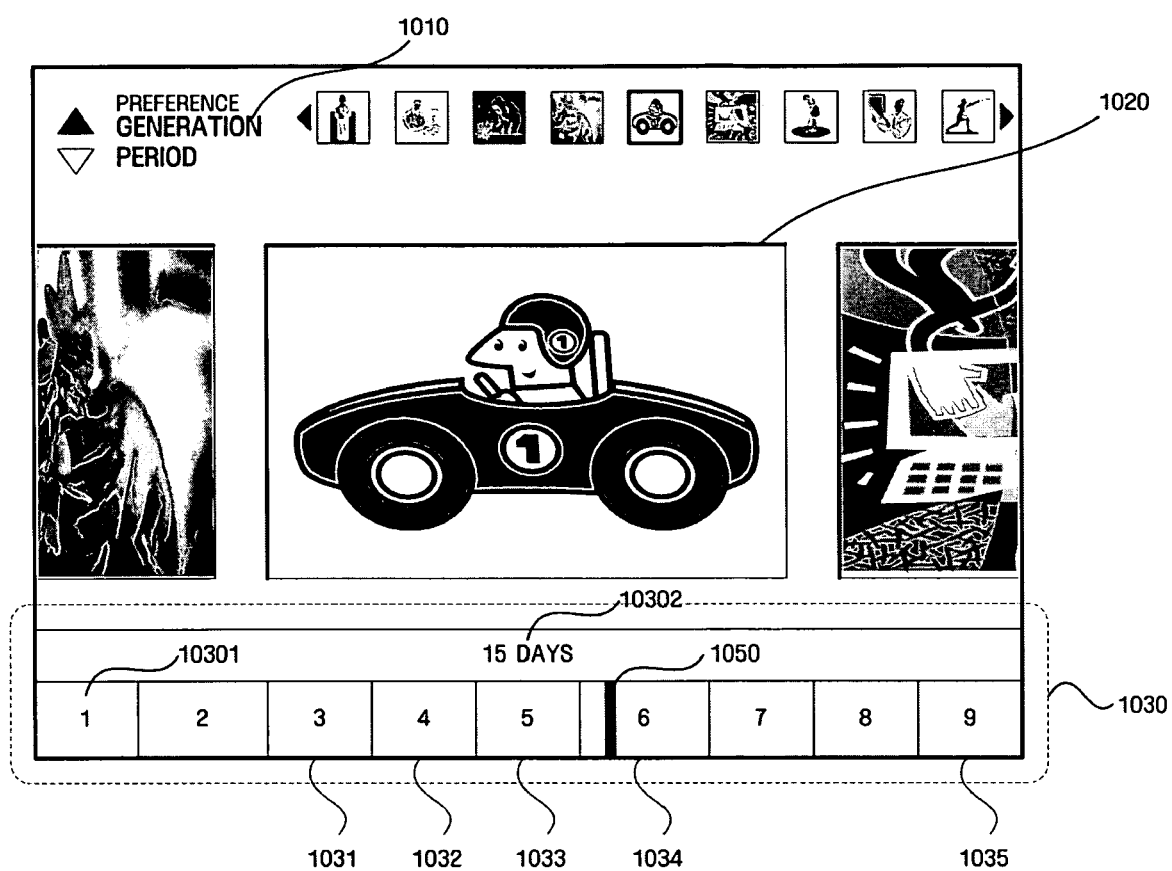
FIG. 10 is a conceptual view illustrating a case where multimedia contents are displayed in a sequence of generation periods according to an exemplary embodiment of the invention.

FIG. 10 is a conceptual view showing a case where the multimedia contents are displayed in a sequence of the generation periods according to an exemplary embodiment of the invention. Referring to FIG. 10, the alignment condition of the alignment condition region is selected to be the sequence of the generation period 1010 of the multimedia contents, and the detailed condition region 1030 is subdivided into the detailed condition of the generation period.

In the detailed conditions, texts 10302 and numerals 10301 of the generation periods are displayed. The sizes of the detailed condition can proportionally vary according to the number of the multimedia contents included in the corresponding generation period. Further, in the detailed condition region 1030, a pointer 1050 can be located at a portion corresponding to the generation period of the currently displayed multimedia contents 1020. Therefore, the user can know the position of the displayed multimedia contents 1020 among all the multimedia contents, which are arranged according to the sequence of the generation periods, using the position of the pointer 1050.

The user can search the detailed condition of the generation period using the left and right buttons. For example, when the currently selected detailed condition is a region 4 1032, the user can select a region 3 1031 using the left button, and can select a region 5 1033 using the right button. Further, the user can search the detailed condition of the generation period using the numeral buttons. For example, the user can use a numeral button 6 in order to select a region 6 1034, and can use a numeral button 9 in order to select a region 9 1035.

Here, the multimedia contents that is first displayed after the detailed condition is changed may be multimedia contents that is located at the top of the multimedia contents among the multimedia contents extracted corresponding to the changed detailed condition.

Figure 11:
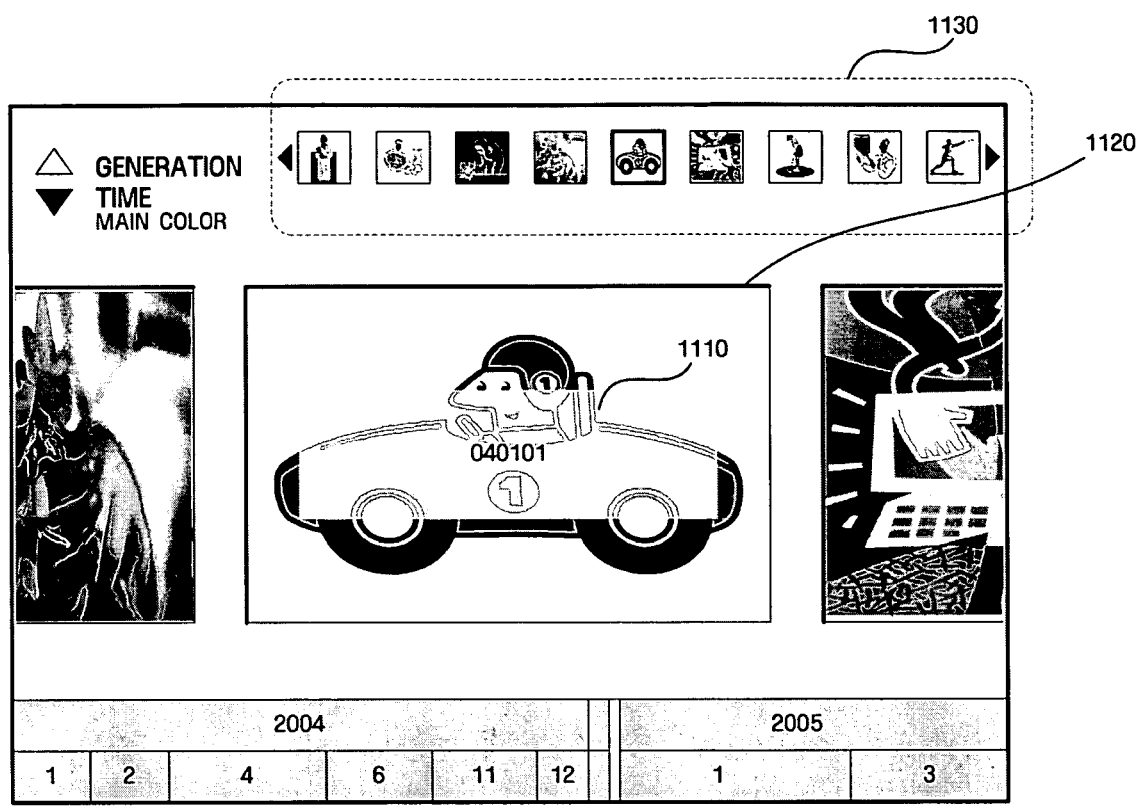
FIG. 11 is a conceptual view illustrating a case where multimedia contents are searched according to an exemplary embodiment of the invention.

FIG. 11 is a conceptual view showing a case where the multimedia contents are searched according to an exemplary embodiment of the invention. Referring to FIG. 11, the multimedia contents are searched by inputting a numeral corresponding to the date or a numeral corresponding to the arrangement sequence according to the alignment condition.

For example, when searching multimedia contents generated on Jan. 1, 2004, the user can input a numeral "040101" 1110 corresponding to that date. Accordingly, the contents display device 400 displays the multimedia contents 1120 generated on Jan. 1, 2004, and displays thumbnails 1130 of the multimedia contents generated on that date and near that date. At this time, if there are no multimedia contents generated on Jan. 1, 2004, the contents display device 400 can display the multimedia contents generated on the near date and the thumbnails.

In addition, the user can search the multimedia contents using numerals corresponding to the arrangement sequence according to the alignment condition. For example, when the number of the stored multimedia contents is 100, if the user inputs a numeral of 55, the contents display device 400 displays the 55$^{th}$ multimedia contents among the multimedia contents arranged according to the currently selected alignment condition.

Figure 12:
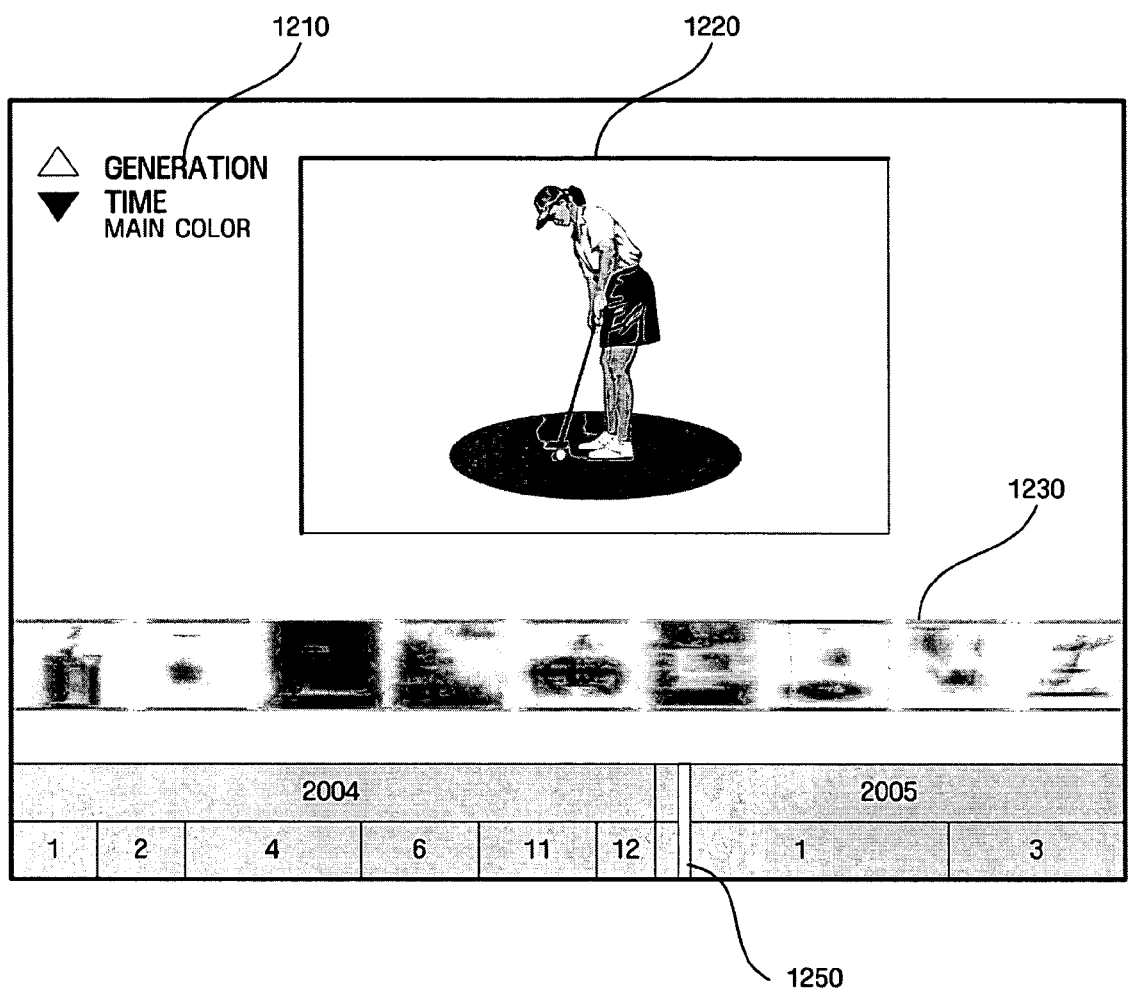
FIG. 12 is a conceptual view illustrating a case where multimedia contents are searched according to another exemplary embodiment of the invention.

FIG. 12 is a conceptual view showing a case where the multimedia contents are searched according to another exemplary embodiment of the invention. FIG. 12 shows a case where a fast search in a corresponding direction is performed when a selection delay time of one of the left and right buttons exceeds a predetermined critical time.

In FIG. 12, the alignment condition is selected to be a sequence of the generation time 1210 of the multimedia contents. Accordingly, the multimedia contents stored in the storage unit 440 are extracted in a sequence of the generation time. At this time, if one of the left and right buttons is selected by the user beyond the predetermined critical time, the display unit 470 moves the thumbnails 1230 one by one in a predetermined region of the screen, and displays the selected multimedia contents 1220 according to the shift of the thumbnails 1230 in another region of the screen. That is, as the focus of the thumbnail changes, the multimedia contents 1220 corresponding to the focused thumbnail is displayed. Therefore, the user can search the desired multimedia contents using the displayed multimedia contents 1220 or the thumbnails 1230.

Meanwhile, during the fast search, the pointer 1250 of the detailed condition region is displayed at a position corresponding to the multimedia contents 1220 currently displayed, such that the user can recognize a current search position.

Figure 13:
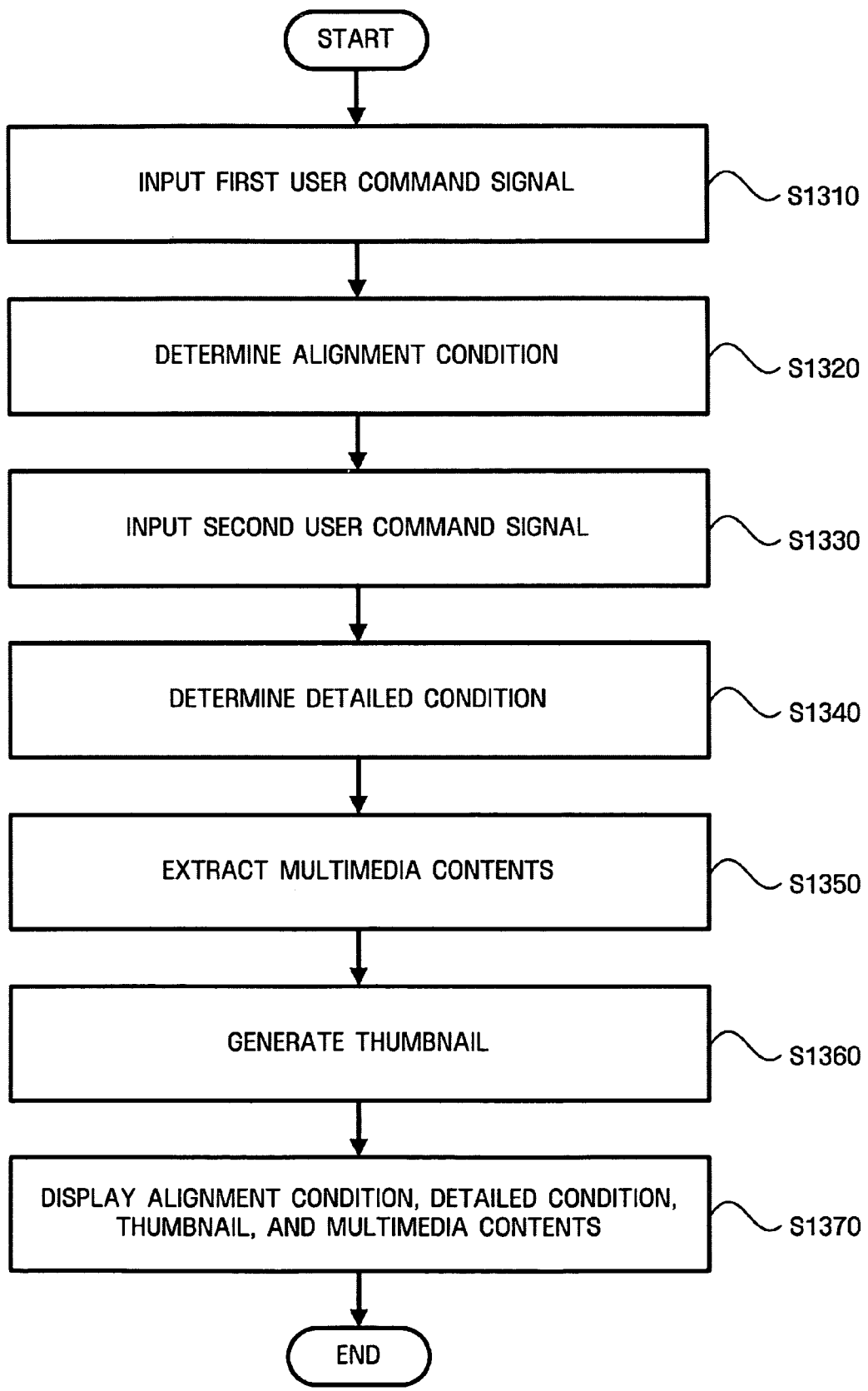
FIG. 13 is a conceptual view illustrating a process of displaying multimedia contents according to an exemplary embodiment of the invention.

FIG. 13 is a conceptual view showing a process of displaying multimedia contents according to an exemplary embodiment of the invention.

In order to display the multimedia contents, the input unit 410 of the contents display device 400 first receives the first user command signal (Step S1310). The user can input the first user command signal using the buttons of the remote control device or the buttons of the portable terminal.

The input user command is transmitted to the alignment condition determination unit 420, and then the alignment condition determination unit 420 determines the alignment condition corresponding to the first user command signal among the plurality of alignment conditions (Step S1320). Here, the first user command signal includes the direction button signals, and thus the alignment condition determination unit 420 can determine the alignment condition according to the up/down button signal among the direction button signals.

The plurality of alignment condition includes at least one of a sequence of generation time of the first multimedia contents, a sequence of primary colors included in the first multimedia contents, a sequence of contents included in the first multimedia contents, a sequence of user's preference for the first multimedia contents, and a sequence of generation periods in which the first multimedia contents are stored. The details of the plurality of alignment condition are as described above and then they will be omitted.

Then, the input unit 410 can receive the second user command signal (Step S1330). The user can input the second user command signal using the buttons of the remote control device or the buttons of the portable terminal.

The input user command is transmitted to the detailed condition determination unit 430, and then the detailed condition determination unit 430 determines the detailed condition corresponding to the second user command signal among the detailed conditions included in the alignment condition determined by the alignment condition determination unit 420 (Step S1340). Here, the second user command signal includes at least one of the direction button signals and the numeral button signals. The detailed condition determination unit 430 can determine the detailed condition according to the left/right button signal among the direction button signals or one of the numeral button signals.

The determined detailed condition is transmitted to the contents extraction unit 450, and the contents extraction unit 450 extracts the multimedia contents stored in the storage unit 440 according to the determined detailed condition (Step S1350). Here, the contents extraction unit 450 can extract the multimedia contents selected by the user according to the left/right button signal among the direction button signals or one of the numeral button signals. That is, the contents extraction unit 450 extracts the multimedia contents corresponding to the detailed condition changed according to the left/right button signal or extracts the multimedia contents corresponding to the numeral button signal.

Contents extraction unit 450 can extract multimedia contents around the multimedia contents previously selected. For example, when a specified multimedia contents is selected by the user and displayed, even though the alignment condition and the detailed condition are changed, the displayed multimedia contents continues to be displayed, and the multimedia contents around the displayed multimedia contents are extracted.

The extracted multimedia contents are transmitted to the thumbnail generation unit 460, and the thumbnail generation unit 460 generates thumbnails for the transmitted multimedia contents (Step S1360). Here, the thumbnail generation unit 460 does not generate the thumbnails for all the transmitted multimedia contents, but generates the maximum number of thumbnails that can be displayed in the thumbnail region. Further, when the extracted multimedia contents is motion pictures, the thumbnail generation unit 460 may generate a thumbnail for the first frame of the motion picture or may generate a thumbnail for a frame selected by the user.

The generated thumbnails and multimedia contents are transmitted to the display unit 470 which displays the alignment condition, the detailed condition, the transmitted thumbnail, and the multimedia contents selected by the user among the transmitted multimedia contents in the alignment condition region, the detailed condition region, the thumbnail region, and the multimedia contents region, respectively, (Step S1370).

The user can search the thumbnails in the thumbnail region using the left and right buttons. Here, the multimedia contents for the focused thumbnail is displayed as the multimedia contents selected by the user.

Meanwhile, the display unit 470 displays a part of multimedia contents close to the multimedia contents selected by the user while displaying the multimedia contents selected by the user. In such a manner, the user can visualize adjacent multimedia contents as a whole, and can also guess the characteristics of the multimedia contents in the search direction through the multimedia contents displayed in whole and adjacent multimedia contents displayed in part.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

As described above, according to the apparatus and the method of displaying multimedia contents of the invention, the stored multimedia contents may be displayed to suit the user's taste using limited buttons of a remote control device or a portable terminal, and thus the user can simply and quickly search desired multimedia contents.

What is claimed is:

1. An apparatus for displaying multimedia contents stored in a memory, the apparatus comprising:
   an alignment condition determination unit which determines an alignment condition, from among a plurality of alignment conditions, corresponding to a first user command signal;
   a detailed condition determination unit which determines a detailed condition, from among detailed conditions included in the alignment condition, corresponding to a second user command signal;
   a contents extraction unit which extracts first multimedia contents, from among the multimedia contents stored in the memory, according to the determined detailed condition; and
   a display unit, executed by a display device, which displays the determined alignment condition in a first region, displays the determined detailed condition in a second region, displays a second multimedia contents selected by a user from among the extracted first multimedia contents along with parts of the first multimedia contents that are side-by-side to the second multimedia contents in a third region that is separate from the second region, and displays, at the same time as displaying at least the second multimedia contents in the third region, thumbnails that represent the first multimedia contents in a sequence according to the alignment condition and the detailed condition that correspond to the first multimedia contents and are sequentially arranged in a fourth region of a screen.

2. The apparatus of claim 1, wherein the first user command signal comprises direction button signals.

3. The apparatus of claim 2, wherein the alignment condition determination unit determines the alignment condition according to an up/down button signal among the direction button signals.

4. The apparatus of claim 1, wherein the second user command signal comprises at least one of direction button signals and numeral button signals.

5. The apparatus of claim 4, wherein the detailed condition determination unit determines the detailed condition according to a left/right button signal among the direction button signals or one of the numeral button signals.

6. The apparatus of claim 1, wherein the plurality of alignment conditions comprises at least one of a sequence of generation time of the multimedia contents, a sequence of main colors included in the multimedia contents, a sequence of contents included in the multimedia contents, a sequence of user's preference for the multimedia contents, and a sequence of generation periods in which the multimedia contents are generated.

7. The apparatus of claim 1, wherein the contents extraction unit extracts the first multimedia contents around the multimedia contents previously selected by the user.

8. The apparatus of claim 1, wherein the display unit displays the determined alignment condition and alignment conditions close to the determined alignment condition in the first region.

9. The apparatus of claim 1, wherein the display unit displays a pointer in a portion corresponding to the detailed condition of the second multimedia contents in the second region.

10. The apparatus of claim 2, wherein, if one of the direction button signals is selected beyond a predetermined critical time, the display unit shifts each thumbnail from the extracted first multimedia contents to the next frame at high speed in a predetermined region of the screen, and displays multimedia contents selected according to the shift in another region of the screen.

11. The apparatus of claim 1, wherein the display unit displays the thumbnails for a part or all of the extracted first multimedia contents.

12. The apparatus of claim 11, further comprising a thumbnail generation unit which generates the thumbnails.

13. The apparatus of claim 1, wherein the first multimedia contents comprise still pictures and motion pictures.

14. A method of displaying multimedia contents stored in a memory, the method comprising:
   determining an alignment condition, from among a plurality of alignment conditions, corresponding to a first user command signal;
   determining a detailed condition, from among detailed conditions included in the alignment condition, corresponding to a second user command signal;
   extracting first multimedia contents, from among the multimedia contents stored in the memory, according to the determined detailed condition; and
   displaying, using a display device, the determined alignment condition in a first region,
   displaying the determined detailed condition in a second region, and
   displaying a second multimedia contents selected by a user from among the extracted first multimedia contents along with parts of the first multimedia contents that are side-by-side to the second multimedia contents in a third region that is separate from the second region, and
   displaying, at the same time as displaying at least the second multimedia contents in the third region, thumbnails that represent the first multimedia contents in a sequence according to the alignment condition and the detailed condition that correspond to the first multimedia contents and are sequentially arranged in a fourth region of a screen.

15. The method of claim 14, wherein the first user command signal comprises direction button signals.

16. The method of claim 15, wherein the determining of the alignment condition comprises determining the alignment condition according to an up/down button signal among the direction button signals.

17. The method of claim 14, wherein the second user command signal comprises at least one of direction button signals and numeral button signals.

18. The method of claim 17, wherein the determining of the detailed condition comprises determining the detailed condition according to a left/right button signal among the direction button signals or one of the numeral button signals.

19. The method of claim 14, wherein the plurality of alignment conditions comprise at least one of a sequence of generation time of the multimedia contents, a sequence of main colors included in the multimedia contents, a sequence of contents included in the multimedia contents, a sequence of user's preference for the multimedia contents, and a sequence of generation periods in which the multimedia contents are generated.

20. The method of claim 14, wherein the extracting comprises extracting the first multimedia contents around the multimedia contents previously selected by the user.

21. The method of claim 14, wherein the displaying comprises displaying the determined alignment condition and alignment conditions close to the determined alignment condition in the first region.

22. The method of claim 14, wherein the displaying comprises displaying a pointer in a portion corresponding to the detailed condition of the second multimedia contents in the second region.

23. The method of claim 15, wherein, if one of the direction button signals is selected beyond a predetermined critical time, the displaying comprises shifting each thumbnail from the extracted first multimedia contents to the next frame at high speed in a predetermined region of the screen and displaying multimedia contents selected according to the shift in another region of the screen.

24. The method of claim 14, wherein the displaying the thumbnails comprises displaying the thumbnails for a part or all of the extracted first multimedia contents.

25. The method of 24, further comprising generating the thumbnails.

26. The method of 14, wherein the first multimedia contents comprise still pictures and motion pictures.

27. The method of claim 14, wherein the fourth region is separate from the third region.

28. The apparatus of claim 1, wherein the fourth region is separate from the third region.

29. An apparatus for displaying multimedia contents stored in a memory, the apparatus comprising:

an arrangement sequence determination unit which determines an arrangement sequence for arranging the multimedia contents, from among a plurality of arrangement sequences for arranging the multimedia contents, in response to a first user command signal;

a detailed condition determination unit which determines a detailed condition, from among conditions included in the determined arrangement sequence, in response to a second user command signal;

a contents extraction unit which searches the multimedia contents stored in the memory based on the determined arrangement sequence and the detailed condition, and which extracts a subset of the multimedia contents based on the searching; and a display unit, executed by a processor, which displays on a screen the determined arrangement sequence in a first region, displays on the screen the determined detailed condition in a second region, displays on the screen an image selected by a user from among the subset of the multimedia contents, along with parts of the multimedia contents included in the subset that are side-by-side to the selected image, in a third region that is separate from the second region, and displays on the screen, at the same time as displaying at least the image in the third region, thumbnails that represent the first multimedia contents in a sequence according to the arrangement sequence and the detailed condition that correspond to the multimedia contents included in the subset and are sequentially arranged, in a fourth region.

* * * * *